United States Patent
Paik et al.

(10) Patent No.: US 7,457,060 B2
(45) Date of Patent: Nov. 25, 2008

(54) LENS DRIVING DEVICE

(75) Inventors: Ki Mun Paik, Gyunggi-Do (KR); Dong Kyun Lee, Seoul (KR); Burhanettin Koc, Gyunggi-Do (KR); Byung Woo Kang, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 11/707,165

(22) Filed: Feb. 16, 2007

(65) Prior Publication Data
US 2007/0195438 A1    Aug. 23, 2007

(30) Foreign Application Priority Data
Feb. 20, 2006    (KR)    ........... 10-2006-0016337

(51) Int. Cl.
G02B 7/02    (2006.01)
G02B 15/14    (2006.01)
(52) U.S. Cl. ................................. 359/824; 359/703
(58) Field of Classification Search .............. 359/694, 359/696–698, 703–704, 813–814, 822–826
See application file for complete search history.

(56) References Cited

U.S. PATENT DOCUMENTS

| | | | |
|---|---|---|---|
| 5,490,015 A * | 2/1996 | Umeyama et al. ........... 359/824 |
| 5,515,210 A * | 5/1996 | Devenyi ..................... 359/823 |
| 5,644,440 A * | 7/1997 | Akada ........................ 359/823 |
| 5,768,038 A | 6/1998 | Emura | |
| 6,215,605 B1 | 4/2001 | Kuwana et al. | |
| 6,268,970 B1 | 7/2001 | Ito et al. | |
| 2002/0030422 A1 | 3/2002 | Hata | |
| 2004/0174622 A1 * | 9/2004 | Kang et al. ................ 359/824 |
| 2005/0067922 A1 | 3/2005 | Sasaki et al. | |

FOREIGN PATENT DOCUMENTS

| EP | 1 753 040 | 2/2007 |
|---|---|---|
| EP | 1 753 044 | 2/2007 |

(Continued)

OTHER PUBLICATIONS

UK Search Report, mailed Jun. 20, 2007 and issued in corresponding UK Patent Application No. GB0703094.3.

(Continued)

Primary Examiner—Scott J. Sugarman
Assistant Examiner—Dawayne A Pinkney

(57) ABSTRACT

A lens driving device includes a lens barrel having a lens holder and an extension part extended from the lens holder. The device also includes a piezoelectric vibrator with a piezoelectric body flexed and bent in response to power application with a friction member in contact with the extension part, thereby providing driving power for transporting the lens barrel. The device further includes a preload member having a free end in resilient contact with a rear end of the piezoelectric body to compress the piezoelectric vibrator against the extension part and a guiding part for guiding the transport of the lens barrel in the optical axis direction. This allows a simplified and miniaturized structure, a large transport range with low input power to achieve excellent resolution of positioning, minimal loss of driving power, simplified mechanism for guiding the transport of the lens, and accurate and stable transport of the lens.

18 Claims, 13 Drawing Sheets

FOREIGN PATENT DOCUMENTS

| | | |
|---|---|---|
| EP | 1 753 041 | 3/2007 |
| JP | 10-90584 | 4/1998 |
| JP | 2005-354832 | 12/2005 |
| JP | 2006-098577 | 4/2006 |

OTHER PUBLICATIONS

Office Action issued in corresponding Korean Patent Application No. 10-2006-0016337, on Jul. 11, 2007.

UK Intellectual Property Office Examination Report, issued Jul. 1, 2008.

Chinese Office Action, issued Jul. 11, 2008.

* cited by examiner (a)

(b)

LENS DRIVING DEVICE

CLAIM OF PRIORITY

This application claims the benefit of Korean Patent Application No. 2006-16337 filed on Feb. 20, 2006, in the Korean Intellectual Property Office, the disclosure of which is incorporated herein by reference.

BACKGROUND OF THE INVENTION

1. Field of the Invention

The present invention relates to a lens driving device adopted in an optical apparatus and, more particularly, to a lens driving device having a simplified driving mechanism to accommodate miniaturization and thus capable of minimizing power loss from driving a lens and more accurately driving the lens.

2. Description of the Related Art

In general, optical apparatuses include lens driving devices which move lenses using cam structures, screws or piezoelectric elements. The lens driving devices adopt motors or piezoelectric elements to generate driving power while using cam structures or screws to transmit the driving power.

Therefore, a lens driving device moves a lens to change a relative distance of the lens, thereby performing zooming or focusing functions.

FIG. 1 illustrates a zoom lens barrel 10 for moving a lens using a cam structure disclosed in U.S. Pat. No. 6,268,970.

In the U.S. Pate. No. 6,268,970, lenses 12a, 14a and 16a are moved along the cam curves formed on barrels 12, 14 and 16, respectively, to maintain relative distances of the lenses necessary for zooming or focusing.

In such a structure, the relative position of each of the lenses 12a, 14a and 16a is determined according to the configuration of a cam structure while an electromagnetic motor is used as a driving source. However, the zoom lens barrel 10 has a plurality of driven reduction gears and is configured to convert the rotation of the barrel moving along the cam curve into linear motion, complicating the structure thereof.

In addition, the above described lens driving device has the plurality of reduction gears, hindering miniaturization. Further, it uses an electromagnetic motor, requiring high power, generates electromagnetic waves harmful to humans, and has low positioning resolution of the lens.

FIG. 2 illustrates a zoom lens mechanism of a camera which drives a lens using a screw.

As shown, a camera body 22 with an inner space therein has a fixed lens 22a coupled therewith at a subject side. An electromagnetic motor 24 is installed in the inner space of the camera body 22, and a guide screw 24a is coupled with a shaft of the motor 24.

A power transmission member 26 is coupled with an outer circumference of the guide screw 24a, and a lens barrel 28 is coupled with a side of the power transmission member 26.

In addition, a movable lens 28a is coupled with the lens barrel 28, and the barrel 28 is disposed movable along an optical axis with the assistance of a guide shaft 29 that is disposed inside the camera body 22 in the optical axis direction.

Therefore, when the motor 24 operates, the guide screw 24a rotates to move the power transmission member 26 in the optical axis direction. As the power transmission member 26 moves in the optical axis direction, the barrel 28 is guided by the guide shaft 29 to move in the optical axis direction as well, enabling zooming.

However, the zoom lens mechanism 20 of the camera also adopts an electromagnetic motor, thus requiring a plurality of reduction gears, hindering miniaturization. In addition, it is impossible to prevent generation of electromagnetic waves by the motor. Further, the mechanism 20 has low positioning resolution, hindering precise control.

To overcome the aforementioned problems, FIGS. 3a and 3b illustrate a driving device 30 for moving a lens using piezoelectric elements disclosed in U.S. Pat. No. 6,215,605.

That is, the piezoelectric elements 32 are fixed to a base block 34 to transmit displacement to driving rods 36, thereby moving the lenses L1, L2, L3 and L4 with preload generated by sliders 38a, together with inertia and acceleration of lens frames 38. According to the waveform of an input voltage, the lens frames 38 move or slide with the driving rods 36 to enable bidirectional driving.

The driving device 30 does not adopt an electromagnetic motor, and thus electromagnetic waves are not generated. It also does not adopt reduction gears for power transmission, thereby simplifying the structure thereof.

However, as the driving rods 36 are essentially fixed, it is impossible to vary the length of the barrel, thus limiting miniaturization. Also, the driving signal has an asymmetrical waveform rather than a stationary sine waveform, complicating a driving circuit.

Therefore, there arises a need for a lens driving device which can be mounted in a small volume, having a high resolution to enable precise control, and can operate with low driving power while having a sufficient transport range.

SUMMARY OF THE INVENTION

The present invention has been made to solve the foregoing problems of the prior art and therefore an aspect of the present invention is to provide a lens driving device having a simplified structure from a conventional electromagnetic driving mechanism to achieve miniaturization.

Another aspect of the invention is to provide a lens driving device which can obtain a large displacement or transport range of a lens with low input power to achieve excellent positioning resolution, thereby minimizing loss of power consumed for driving the lens.

Further another aspect of the invention is to provide a lens driving device which adopts a simple mechanism for guiding the movement of a lens, thereby accurately and stably driving the lens.

According to an aspect of the invention, the invention provides a lens driving device which includes: a lens barrel including a lens holder for holding at least one lens therein and an extension part extended from the lens holder; a piezoelectric vibrator including a piezoelectric body for being flexed and bent in response to power application and a friction member disposed at a leading end thereof to be in contact with the extension part, the piezoelectric vibrator providing driving power necessary for driving the lens barrel; a preload member having a free end thereof in resilient contact with a rear end of the piezoelectric body to maintain a compressed contact status between the extension part of the lens barrel and the friction member of the piezoelectric vibrator, the preload member providing resilient force that compresses the piezoelectric vibrator against the extension part; and a guiding part for guiding the movement of the lens barrel in the optical axis direction.

Preferably, the piezoelectric vibrator can be a piezoelectric ultrasonic motor having a plurality of piezoelectric layers stacked in a bending direction to produce at least two vibration modes through internal and external electrode structures.

Preferably, the lens barrel further includes a friction member provided on the vertical surface of the extension part, the friction member disposed perpendicular with the friction member of the piezoelectric vibrator to form a contact therebetween.

More preferably, the friction member is disposed in a groove depressed in the vertical surface of the extension part.

More preferably, the friction member of the extension part has a height that is 1.5 times a transport distance of the lens barrel.

Preferably, the preload member is a plate spring having a free end in resilient contact with a rear end of the piezoelectric vibrator while having a fixed end fixed to a base where the piezoelectric vibrator is disposed.

More preferably, the free end of the preload member has a protrusion protruding from a surface thereof so as to be in point contact with the rear end of the piezoelectric vibrator.

Preferably, the preload member has a length longer than that of the piezoelectric vibrator.

Preferably, the guiding part includes a first guide rod having a predetermined length disposed vertically in a first guide groove formed in a portion of the extension part to be movable on a bearing member and a second guide rod having a predetermined length disposed vertically in a second guide groove formed in another portion of the extension part.

More preferably, the bearing member includes upper and lower ball pairs in point contacts with outer surfaces of the first guide groove and outer surfaces of the first guide rod and a retainer having a plurality of upper and lower ball grooves in which the upper and lower balls are rotatably disposed.

More preferably, the upper and lower balls and the first guide rod are disposed at positions corresponding to respective vertexes of a triangle.

More preferably, the first guide rod has a center flush with the point of contact between the friction member of the piezoelectric vibrator and the friction member of the extension part.

More preferably, the point of contact between the friction member of the piezoelectric vibrator and the friction member of the extension part is flush with the point of contact between the free end of the preload member and the piezoelectric vibrator.

More preferably, the second guide rod is disposed in the second guide groove having a rectangular section such that the second guide rod is in point contact with an inner projection protruding from an inner surface of the second guide groove.

Preferably, the lens driving device further includes a base on which the lens barrel is mounted, wherein the base includes a vertical rib for fixing the piezoelectric body of the piezoelectric vibrator, a fixing groove in which the fixed end of the preload member is fixed and a fixing hole in which a lower end of the guiding part is fixed.

More preferably, the vertical rib has a resilient fixing member extending vertically from a lower surface thereof, which is in contact with a lower end of the piezoelectric body, to have a resilient contact with opposed outer surfaces of the piezoelectric body.

More preferably, the vertical rib has a fixing plate disposed in contact with an upper surface of the piezoelectric body so as to prevent upward disengagement and play of the piezoelectric vibrator.

More preferably, the fixing groove is provided between a pair of fixing ribs provided in a corner of the base to form a gap in which the fixed end of the preload member is fixed.

Preferably, the lens driving device further includes an indicator provided at a surface of the lens barrel and a location sensor for sensing a location of the indicator upon vertical movement thereof.

Preferably, the lens driving device also includes a case for protecting the lens barrel, the piezoelectric vibrator, the preload member and the guiding part from the external environment.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
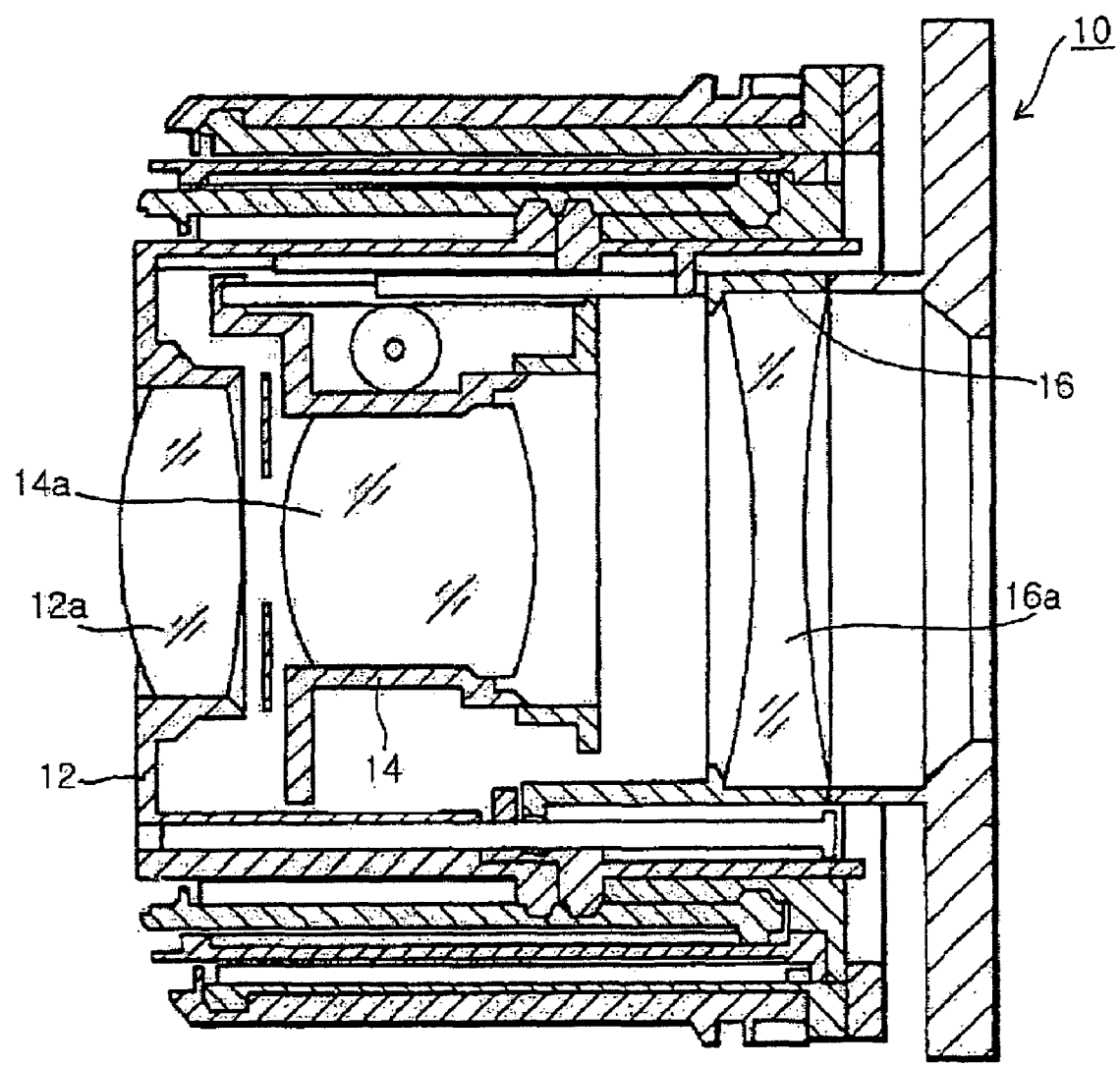
FIG. 1 is a sectional view illustrating a conventional lens driving device using a cam.
Figure 2:
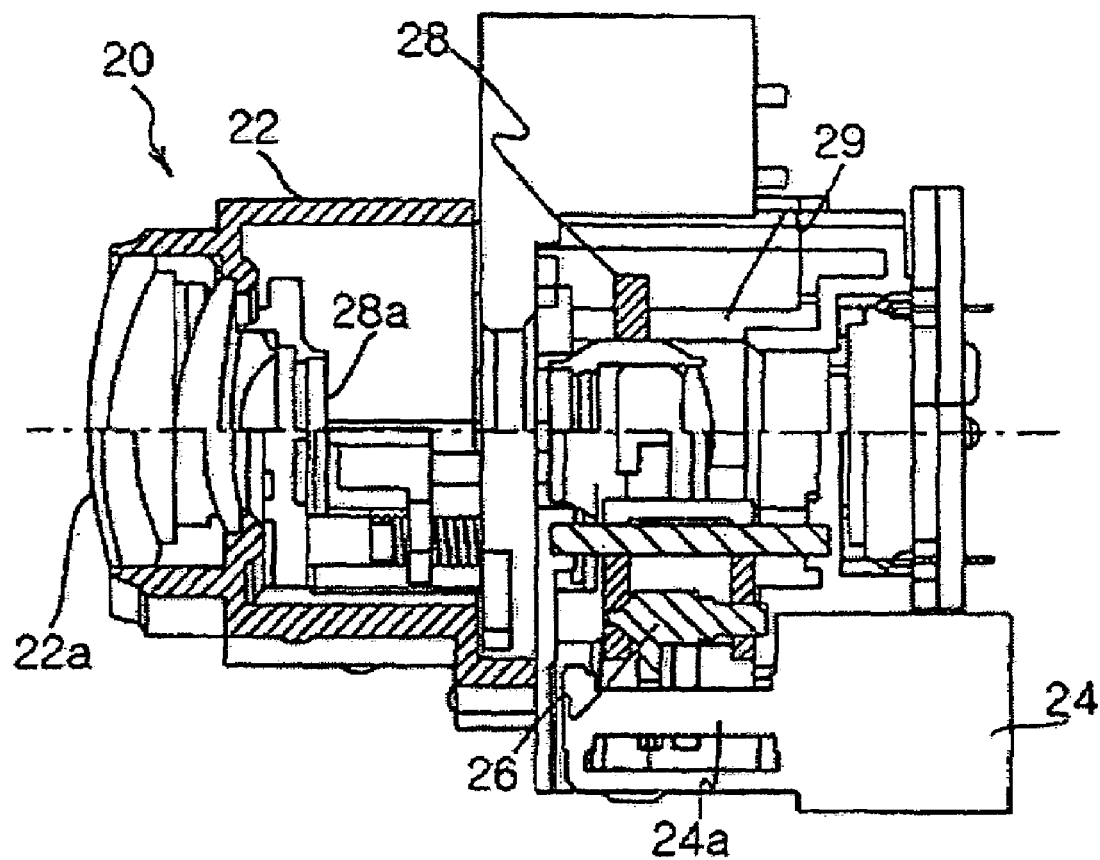
FIG. 2 is a sectional view illustrating a conventional lens driving device using a screw.
Figure 3A:
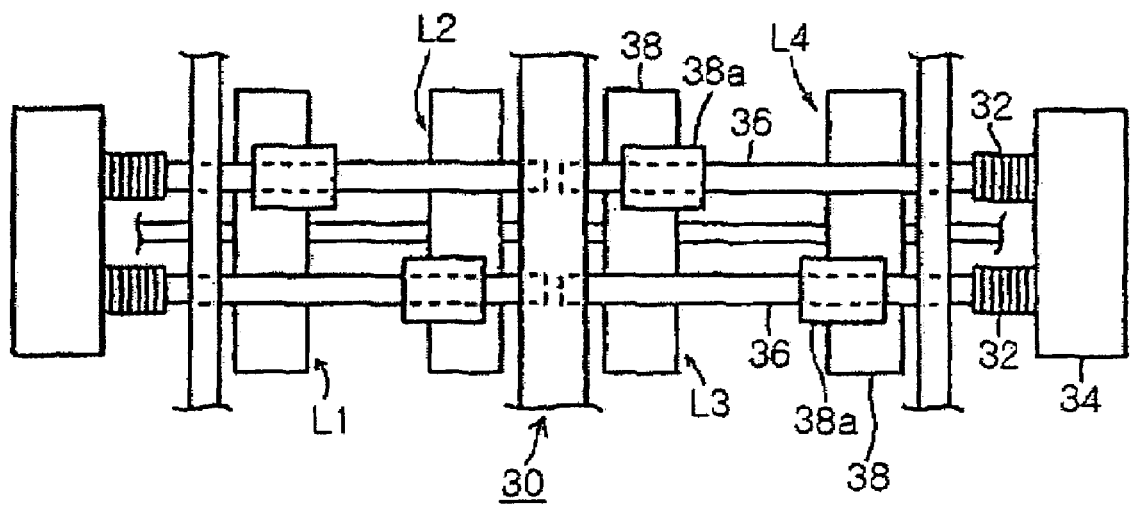
FIG. 3a is an overall plan view illustrating a conventional lens driving device using a piezoelectric element and FIG. 3b is a partially exploded perspective view illustrating the same.
Figure 3B:
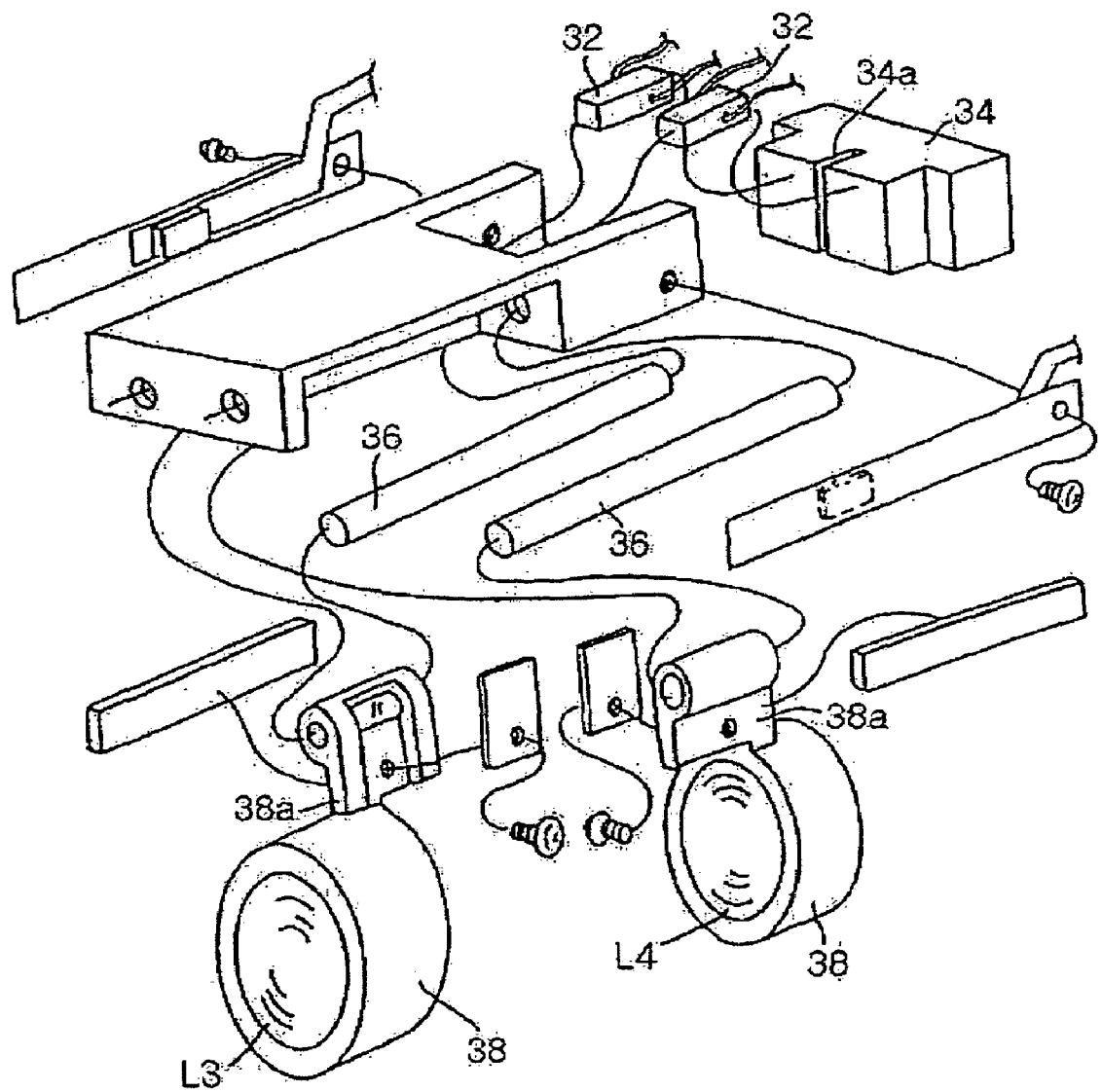
Figure 4:
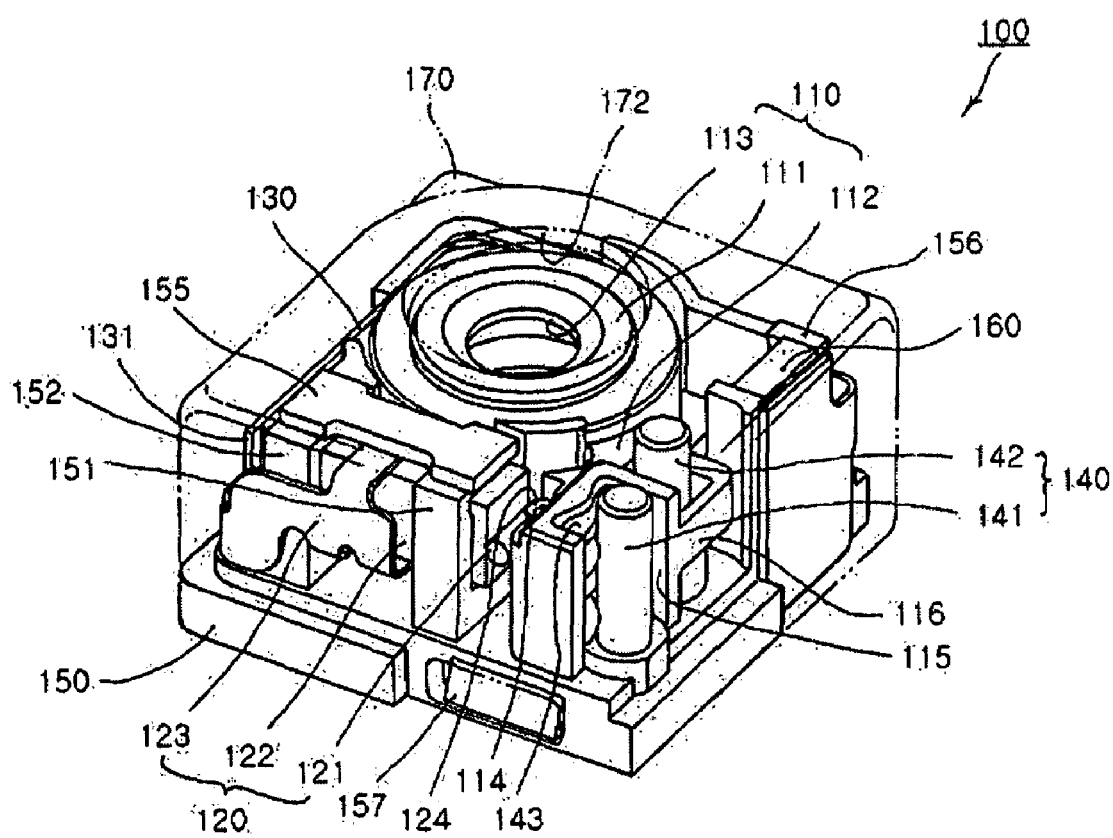
FIG. 4 is a perspective view illustrating a lens driving device according to the present invention.
Figure 5:
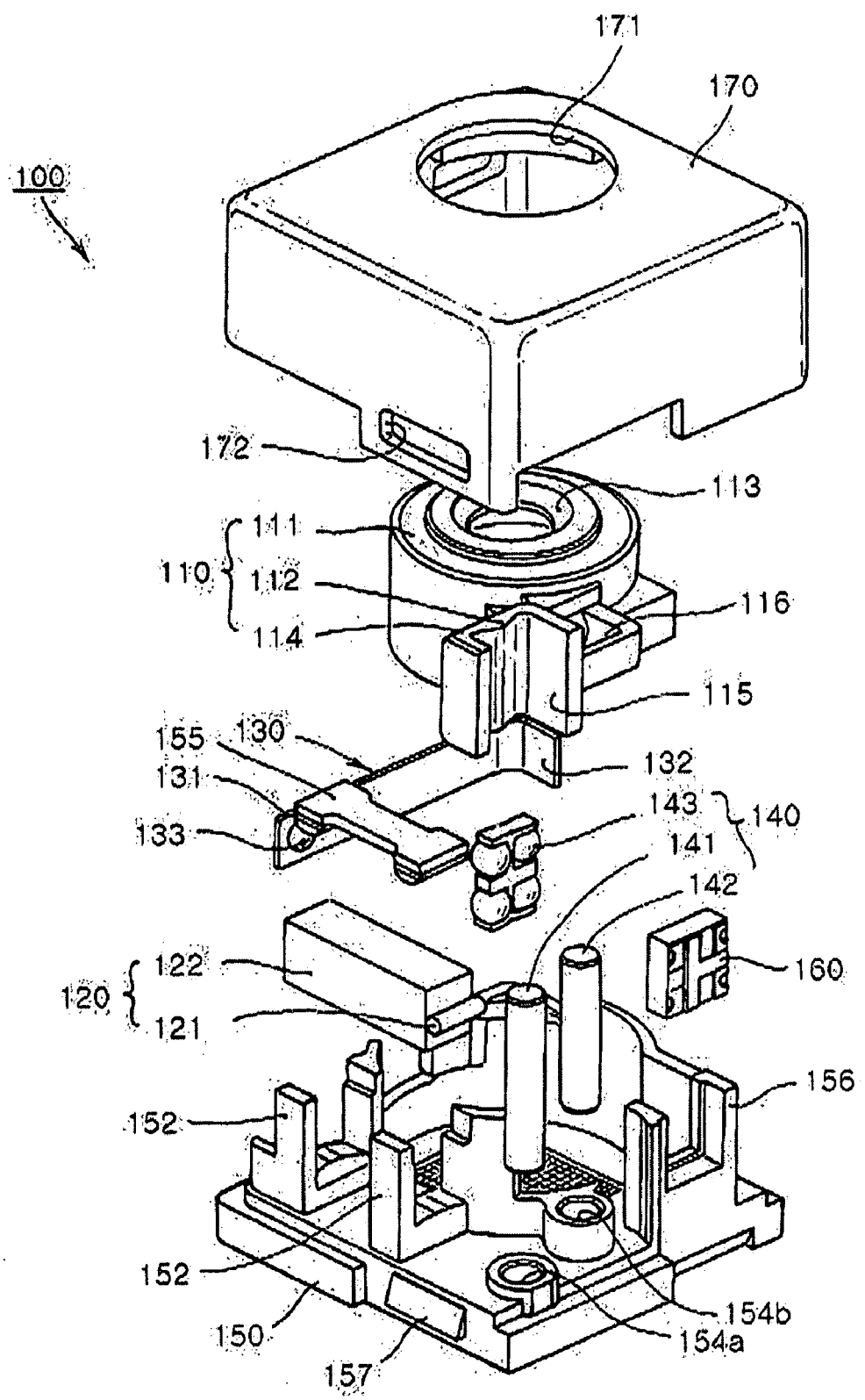
FIG. 5 is an exploded perspective view illustrating the lens driving device according to the present invention.
Figure 6:
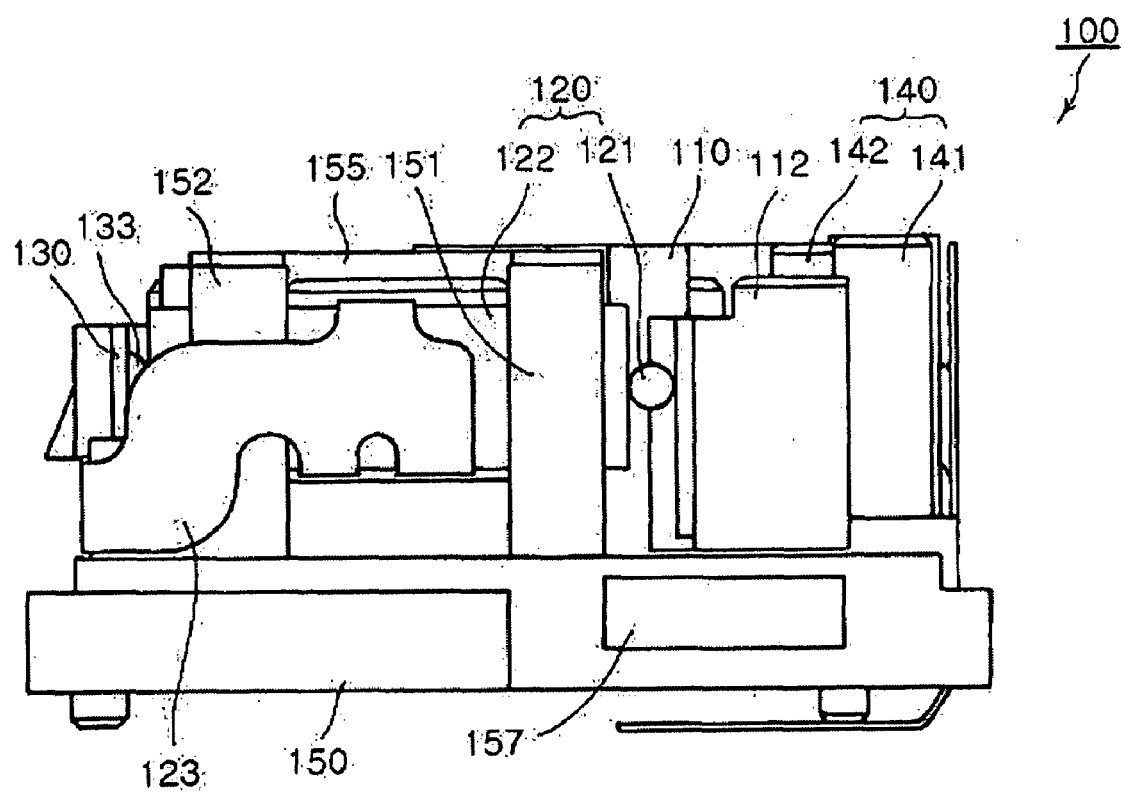
FIG. 6 is a side view illustrating the lens driving device according to the present invention.
Figure 7:
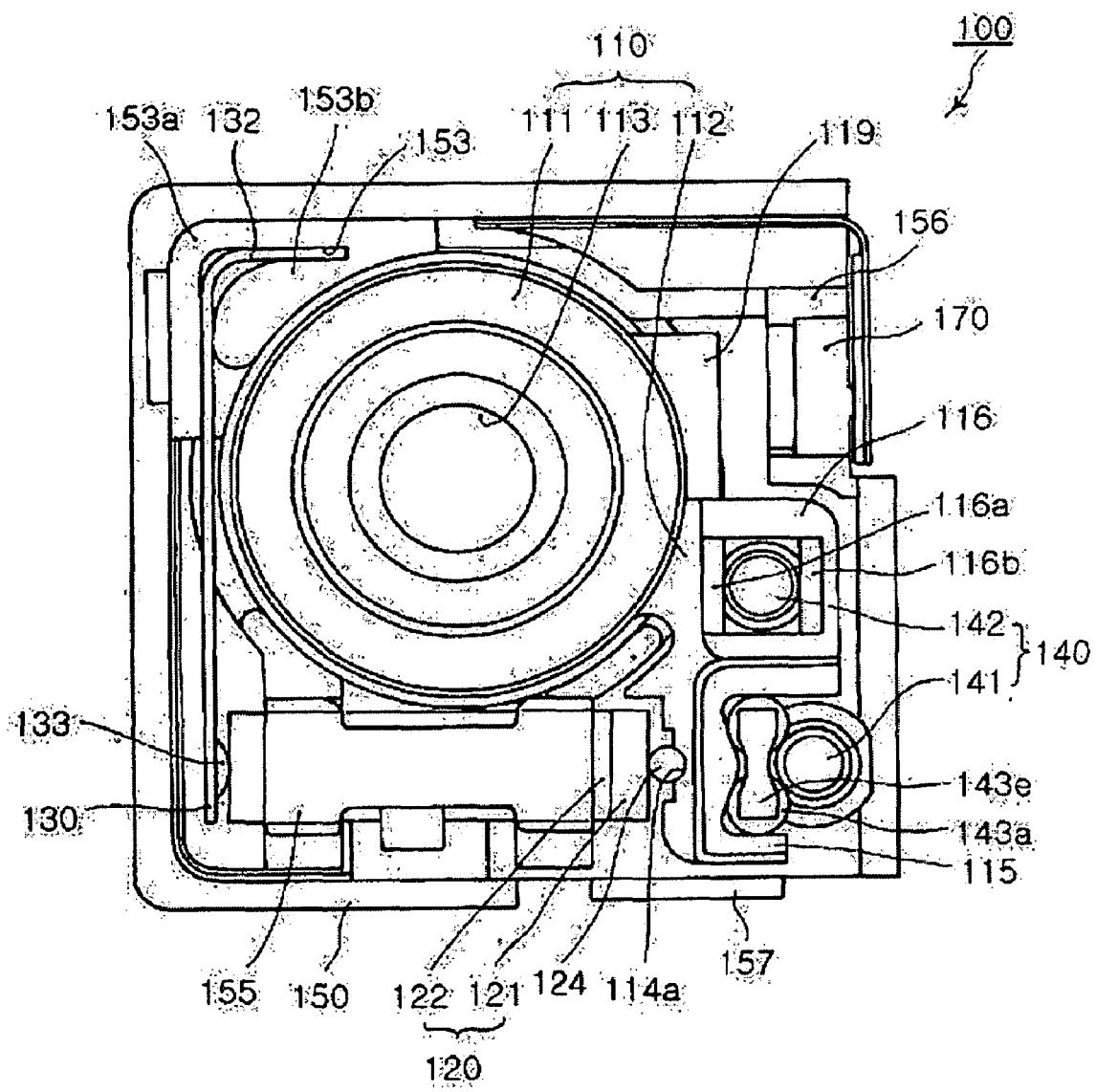
FIG. 7 is a plan view illustrating the lens driving device according to the present invention.

FIG. 4 is an overall perspective view illustrating a lens driving device according to the present invention, FIG. 5 is an exploded perspective view illustrating the lens driving device according to the present invention, FIG. 6 is a side view illustrating the lens driving device according to the present invention and FIG. 7 is a plan view illustrating the lens driving device according to the present invention.

As shown in FIGS. 4 to 7, the lens driving device 100 according to the present invention includes a lens barrel 110 with at least one lens housed therein, a piezoelectric vibrator 120 for providing driving power for moving the lens barrel 110 with the lens therein in the optical axis direction, a preload member 130 for compressing the piezoelectric vibrator 120 and a guiding part 140 for guiding the movement of the lens barrel 110.

As shown in FIGS. 4 and 5, the lens barrel 110 is formed by injection molding to have a lens holder 111 and an extension part 112, and the lens holder 111 has a predetermined size of inner space for housing at least one lens arranged along the optical axis.

The extension part 112 includes a vertical surface 114 extended from an outer surface of the lens holder 111 toward the piezoelectric vibrator 120 in a predetermined length to have a friction member described later disposed thereon and first and second guide grooves 115 and 116 in which first and second guide rods 141 and 142 of the guiding part 140 are fixedly inserted.

Here, the vertical surface 114 is formed at a side of the extension part 112 to face the piezoelectric vibrator 120, and the first and second guide grooves 115 and 116 are formed at the other side of the extension part 112.

Such an extension part 112 can be integrally provided to the lens barrel 110 during injection molding, which however does not limit the invention. The extension part 112 can also be formed separately by injection molding to be assembled with the lens holder 111, which is also formed by injection molding in a cylindrical shape.

The lens holder 111 has a light opening 113 perforated in a predetermined size through an upper surface thereof, in alignment with the optical axis.

In addition, as shown in FIGS. 4 and 5, the piezoelectric vibrator 120 can be a box-shaped piezoelectric ultrasonic motor composed of a friction member 121 and a piezoelectric body 122.

The friction member 121 is provided on a leading end of the piezoelectric body 122 so as to be in contact with a side of the extension part 112 extended from the lens barrel 110. It is preferable that such a friction member 121 is made of a ceramic or metallic material having excellent wear resistance and a relatively large friction coefficient. The shape of the friction member 121 is not limited to a cylinder and also can be a semicircular cylinder, a box, etc. as along as the shape allows transfer of friction force to a corresponding object.

The piezoelectric body 122 has a power cable 123 electrically connected to a plurality of electrode terminals (not shown) to receive power application through an outer surface thereof. In response to the power applied through the external electrode terminals, the piezoelectric body 122, which is composed of plurality of stacked piezoelectric sheets each having particular internal electrodes, produces a flexural mode in a longitudinal direction and a bending mode in a thickness direction.

Such a piezoelectric vibrator 120 is inserted down into a pair of vertical ribs 151 and 152 so that its opposed sides are held by the vertical ribs 151 and 152 which vertically extend from an upper surface of the base 150 that has the lens barrel 110 mounted thereon.

Figure 8:
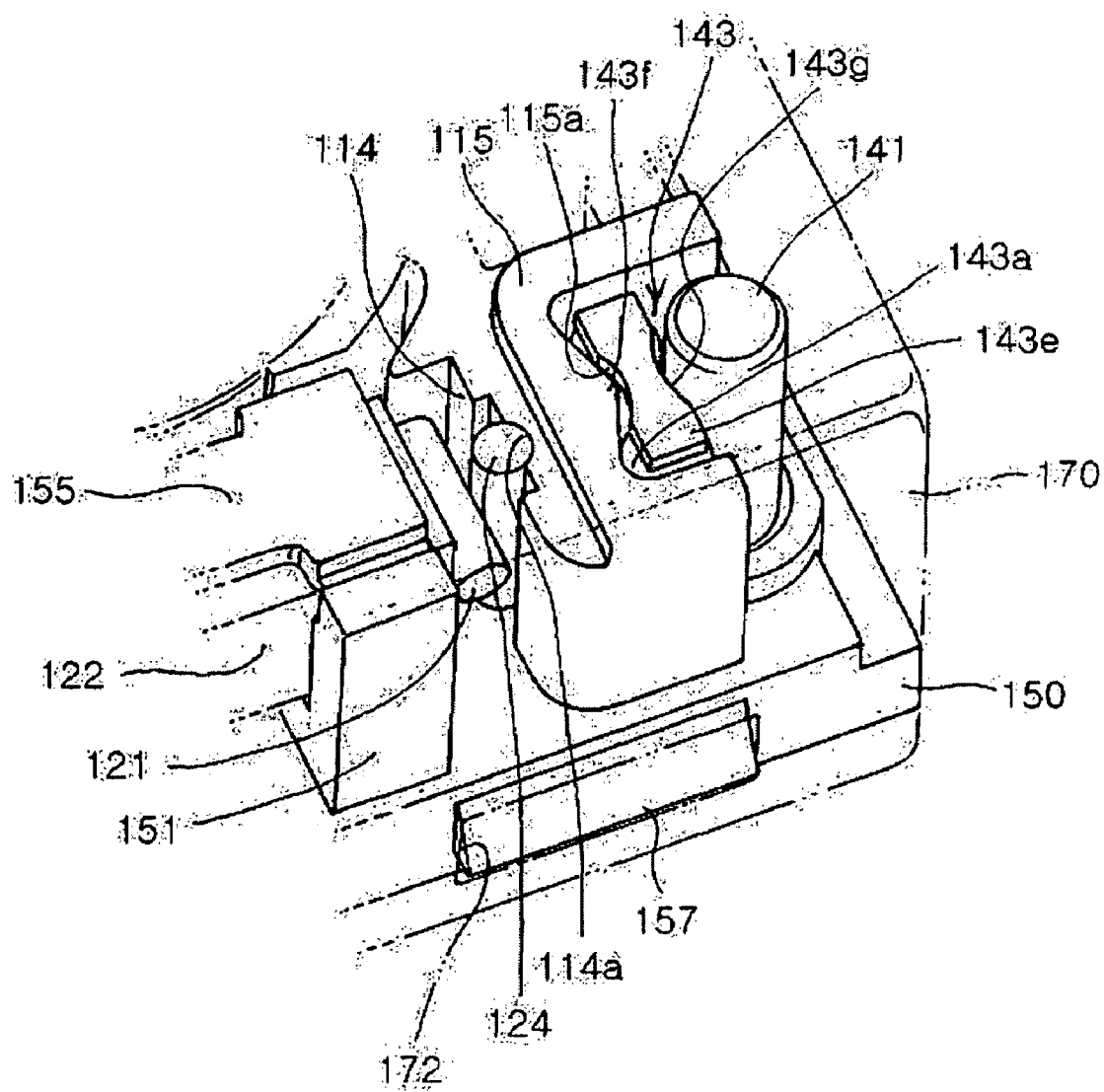
FIG. 8 is a detailed view illustrating the connection between a piezoelectric vibrator, an extension part and a guiding part provided in the lens driving device according to the present invention.

FIG. 8 is a detailed view illustrating the contact state of the piezoelectric vibrator and the extension part provided in the lens driving device according to the present invention. As shown, another friction member 124 is provided on the vertical surface 114 of the extension part 112 facing the friction member 121 of the piezoelectric vibrator 120.

Such a friction member 124 is disposed on the vertical surface 114, perpendicular to the friction member 121 of the piezoelectric vibrator 120 to form a point contact therebetween. Likewise with the friction member 121 of the piezoelectric vibrator 120, it is preferable that the friction member 124 of the extension part 112 is also made of a ceramic or metallic material having excellent wear resistance and a large friction coefficient. The friction member 124 is not limited to a cylinder shape and can be shaped in a semicircular cylinder, a box, etc. which allows transfer of the friction force from a corresponding object.

A groove 114a with a semicircular section may be vertically recessed in the vertical surface 114 of the extension part 112 facing the friction member 121 of the piezoelectric vibrator 120 so as to securely fix the friction member 124 thereon.

At this time, it is preferable that the friction member 124 provided on the vertical surface 114 has a length that is at least 1.5 times the desired transport distance of the lens barrel in order to ensure a more secure and stable contact range between the friction member 121 of the piezoelectric vibrator 120 and the friction member 124 of the extension part 112.

In order to bond the friction members 121 and 124 on the leading end of the piezoelectric body 122 of the piezoelectric vibrator 120 and the vertical surface 114, respectively, the bonding locations are determined while applying a predetermined level of pressure using a separate jig (not shown). While still applying pressure, thermosetting resin is applied to bond the friction members 121 and 124 on the piezoelectric body 122 and the vertical surface 114, respectively.

In addition, as shown in FIGS. 4, 5 and 7, the preload member 130 is a resilient material having a free end 131 in contact with a rear end of the piezoelectric body 122 of the piezoelectric vibrator 120, which is the opposite side of the leading end where friction member 121 is provided, while having a fixed end 132 fixed in a fixing groove 153 of the base 150. Thereby, the preload member 130 applies pressure of a predetermined intensity to the piezoelectric vibrator 120 against the extension part 112.

The free end 131 of the preload member 130 has a protrusion 133 formed thereon to have a point contact with a rear end of the piezoelectric body 122 of the piezoelectric vibrator 120 while the fixed end 132 of the preload member 130 is fixed by the fixing groove 153 and bent to the side of the lens barrel 110.

At this time, it is preferable that the preload member 130 is designed to have a length longer than that of the piezoelectric vibrator 120 so as to obtain an adjustable preload.

In addition, as shown in FIGS. 4 to 8, the guiding part 140 includes the first guide rod 141 and the second guide rod 142 for guiding the movement of the lens barrel 110 as the lens barrel 110 is moved back and forth in the optical axis direction by the driving power provided by the piezoelectric vibrator 120.

The first guide rod 141 having a predetermined length is vertically disposed in a first guide groove 115 formed at a portion of the extension part 112 to be movable on a bearing member 143 provided in between. The second guide rod 142 having a predetermined length is vertically disposed in a second guide groove 116 formed at the other portion of the extension part 112 so as to prevent rotation of the lens barrel 110 about the first guide rod 141 as the lens barrel 110 is moved by the driving power provided by the piezoelectric vibrator 120.

Here, the first and second guide rods 141 and 142 has respective lower ends thereof fixedly inserted into first and second fixing holes 154a and 154b provided in an upper surface of the base 150 so as to be vertically fixed in alignment with the optical axis.

Figure 9:
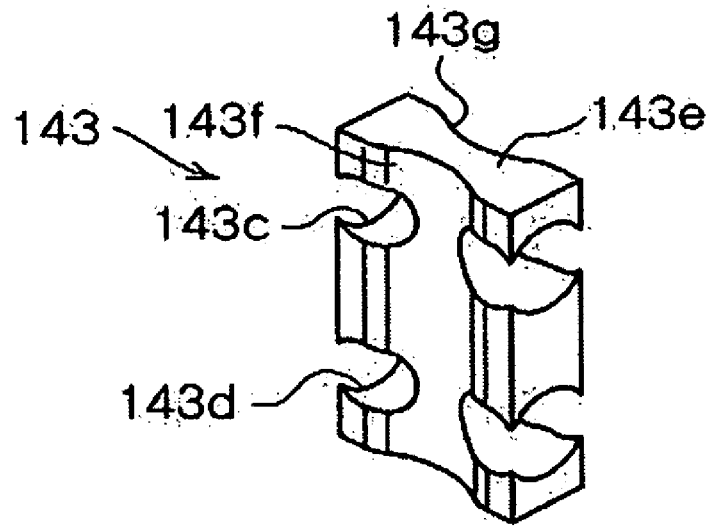
FIG. 9 illustrates a bearing member provided in the lens driving device according to the present invention, in which (a) is a perspective view and (b) is a sectional view.
Figure 9:
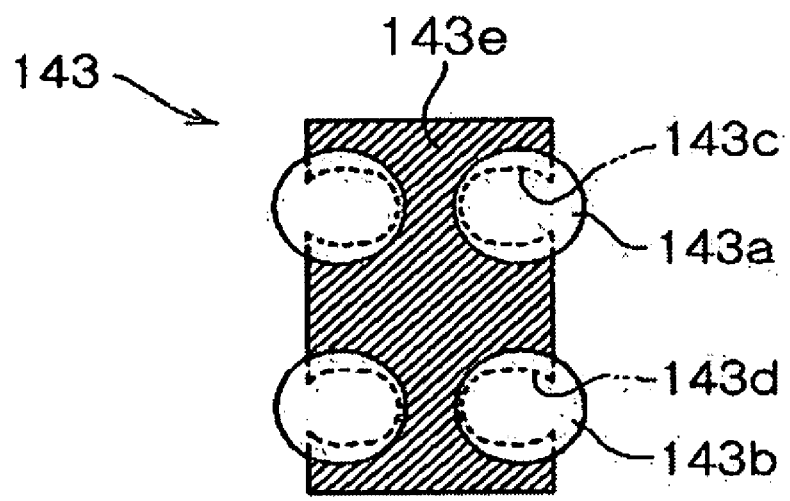
Figure 10:
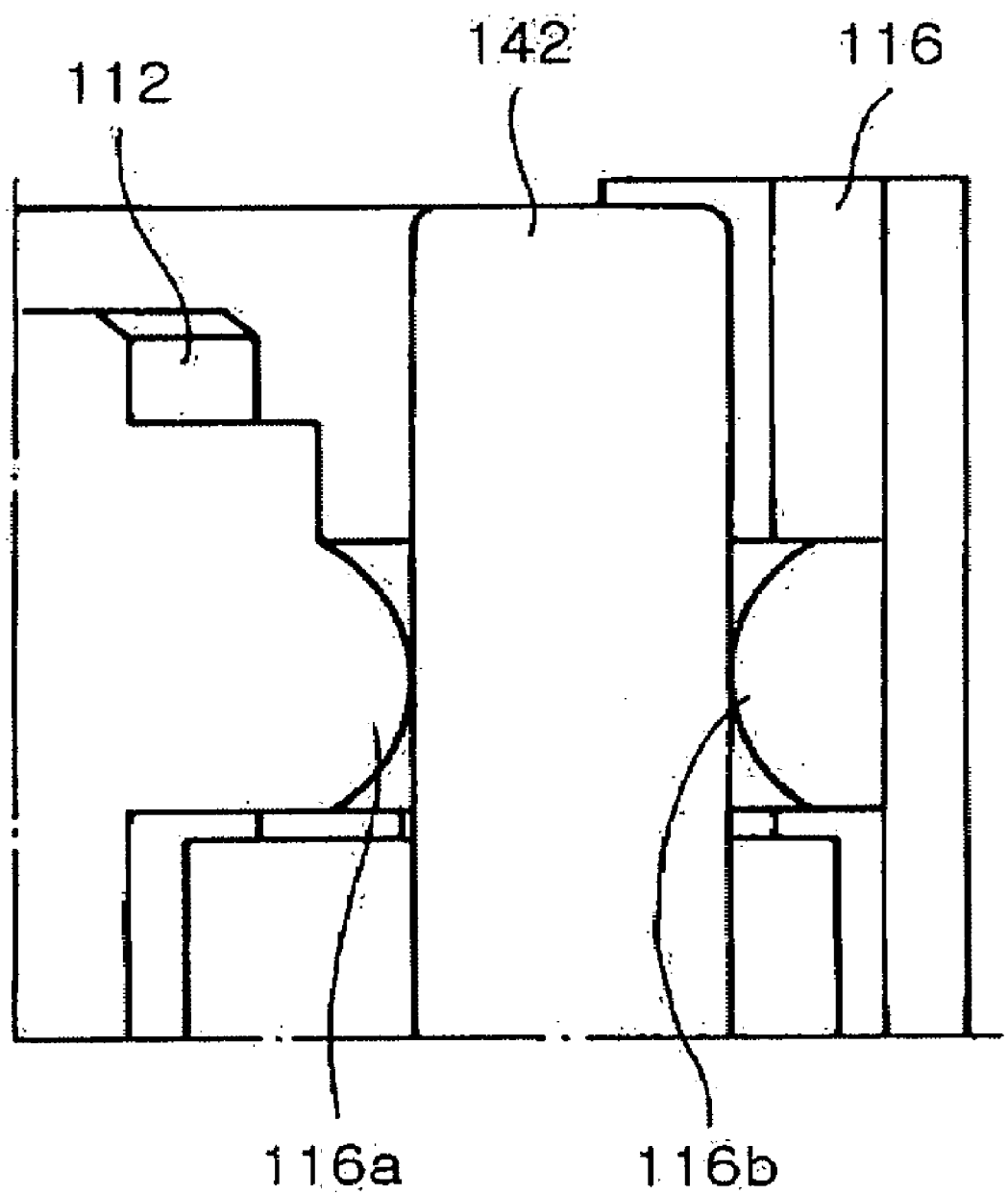
FIG. 10 is a sectional view illustrating the contact status between a second guiding pillar and a second guide groove provided in the lens driving device according to the present invention.
Figure 11:
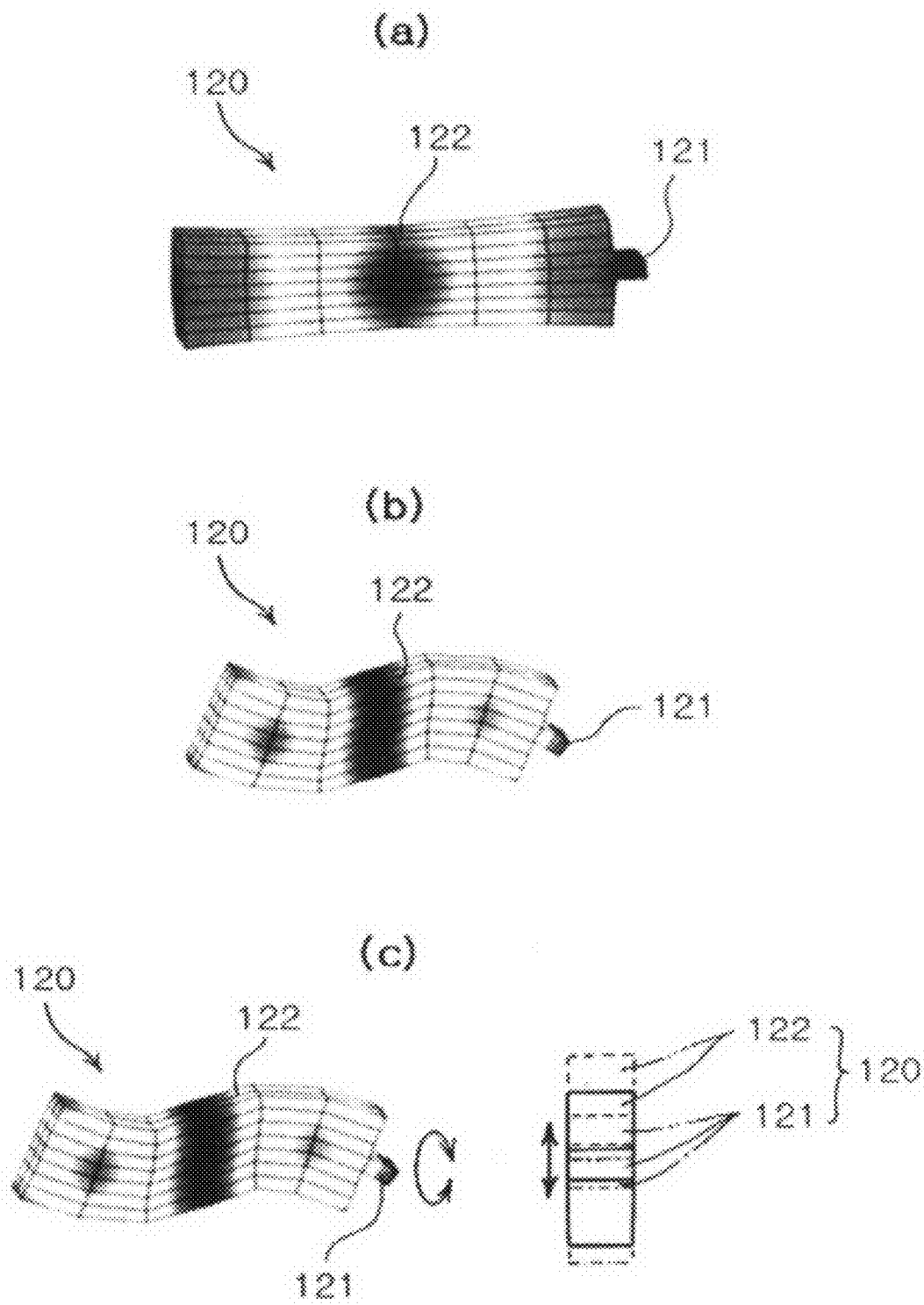
FIG. 11 illustrates the piezoelectric vibrator provided in the lens driving device according to the present invention, in which (a) illustrates a piezoelectric body in a flexural mode in a longitudinal direction, (b) illustrates the piezoelectric body in a bending mode in a thickness direction and (c) illustrates the piezoelectric body in a mixed state of the bending and flexural modes.

In addition, as shown in FIGS. 9(a) and (b), the bearing member 143 provided between the first guide groove 115 and the first guide rod 141 includes pairs of upper and lower balls 143a and 143b in point contacts with outer surfaces of the first guide groove 115 and outer surfaces of the first guide rod 141 and a retainer 143e having a plurality of upper and lower ball grooves 143c and 143d in which the upper and lower balls 143a and 143b are rotatably disposed.

In the front and back surfaces of the retainer 143e, grooves 143f and 143g are recessed to prevent the contact between a projection 115a protruded on the first guide groove 115 and the retainer 143e and between the retainer 143e and the first guide rod 141, respectively.

Here, the upper and lower balls 143a and 143b and the first guide rod 141 are disposed at positions corresponding to respective vertexes of a triangle in order to maintain stable point contact with each other, thereby preventing misalignment.

In addition, it is preferable that the center of the first guide rod 141 is flush with the contact point between the friction member 121 of the piezoelectric vibrator 120 and the friction member 124 of the extension part 112. It is also preferable that the contact point between the friction member 121 of the piezoelectric vibrator 120 and the friction member 124 of the extension part 112 is flush with the contact point between the free end 131 of the preload member 130 and the piezoelectric vibrator 120.

Thereby, the driving power provided by the piezoelectric vibrator 120 is transferred to the friction member 124 of the extension part 112 through the friction member 121 of the piezoelectric vibrator 120 to move the lens barrel 110 back and forth in the optical axis direction while minimizing the loss of power during the back-and-forth movement of the lens barrel 110.

The second guide rod 142 provided in parallel with and at a predetermined interval from the first guide rod 141 is assembled into the second guide groove 116 formed in the extension part 112.

As shown in FIGS. 7 to 10, the second guide groove 116 can be a rectangular case having a rectangular section with inner protrusions 116a and 116b formed on inner surfaces thereof to have point contacts with outer surfaces of the second guide rod 142, thereby minimizing the friction loss generated from the guided movement of the lens barrel.

In the meantime, as shown in FIGS. 4 to 7, the lens driving device 100 of the present invention further includes a base 150 on which the lens barrel 110 is mounted and an image sensor and a substrate, which are not illustrated, are disposed.

The base 150 is a resin structure formed by injection molding to have the vertical ribs 151 and 152 vertically extended to hold the piezoelectric vibrator 120, a fixing groove 153 in which the fixed end 132 of the preload member 130 is fixed, and the first and second fixing holes 154a and 154b into which the first and second guide rods 141 and 142 are fixedly inserted.

The vertical ribs 151 and 152 are of a fixed structure which horizontally holds the piezoelectric body 122 in order to maintain the contact between the friction member 121 of the piezoelectric vibrator 120 and the extension part 112 of the lens barrel 110.

Such vertical ribs 151 and 152 are composed of resilient fixing members having a lower portion thereof in contact with the lower surface of the piezoelectric body 122 and vertically extended to resiliently contact opposed outer surfaces of the piezoelectric body 122.

The vertical ribs 151 and 152 have a fixing plate 155 at upper ends thereof, in contact with an upper surface of the piezoelectric body 122, thereby preventing upward disengagement and play of the piezoelectric vibrator 120.

Thus, the piezoelectric vibrator 120 is inserted down into the vertical ribs 151 and 152 and is prevented from sideward play while it is in contact with the fixing plate 155 to be prevented from upward disengagement and play.

In addition, the fixing groove 153 is a fixing structure provided in a corner of the base 150 so that the fixed end 132 of the preload member 130 is fixed therein.

Such a fixing groove 153 is formed between a pair of fixing ribs 153a and 153b bent in an L-shape, providing a gap into which the fixed end 132 of the preload member 130 is fixedly inserted.

In addition, an indicator 119 is integrally provided to a surface of the lens barrel 110, and a location sensor 160 senses the vertical movement of the indicator 119 so as to detect the location change of the lens barrel 110.

Such a location sensor 160 is fixed by a sensor holder 156 of the base 150, in a location corresponding to the location of the indicator 119. The location sensor 160 has a plurality of terminals for receiving and transmitting signals at a side thereof.

In the meantime, as shown in FIGS. 4 and 5, a case 170 having a predetermined size of inner space is provided over the base 150 to protect the lens barrel 110, the piezoelectric vibrator 120, the preload member 130 and the location sensor 160 from the external environment.

Such a case is a resin structure having an opening 171 formed in an upper surface thereof to expose the light hole 113 of the lens barrel 110 and having an assembly hole 172, which is assembled with the assembly protrusion 157, protruded from an outer surface of the base 150.

Therefore, by the assembly of the assembly hole 172 with the assembly protrusion 157, the case 170 is assembled onto the base 150 to protect the lens barrel 110, the piezoelectric vibrator 120, the preload member 130 and the location sensor 160.

In the lens driving device 100 of the present invention, the lens barrel 110 with at least one lens disposed therein is operated back and forth in the optical axis direction by the driving power for moving the lens barrel 110 generated by longitudinal (flexural) and bending modes of vibration of the piezoelectric body 122 having stacked piezoelectric layers, in response to the external power applied through the power cable 123 formed in the piezoelectric body 122 of the piezoelectric vibrator 120.

Figure 12:
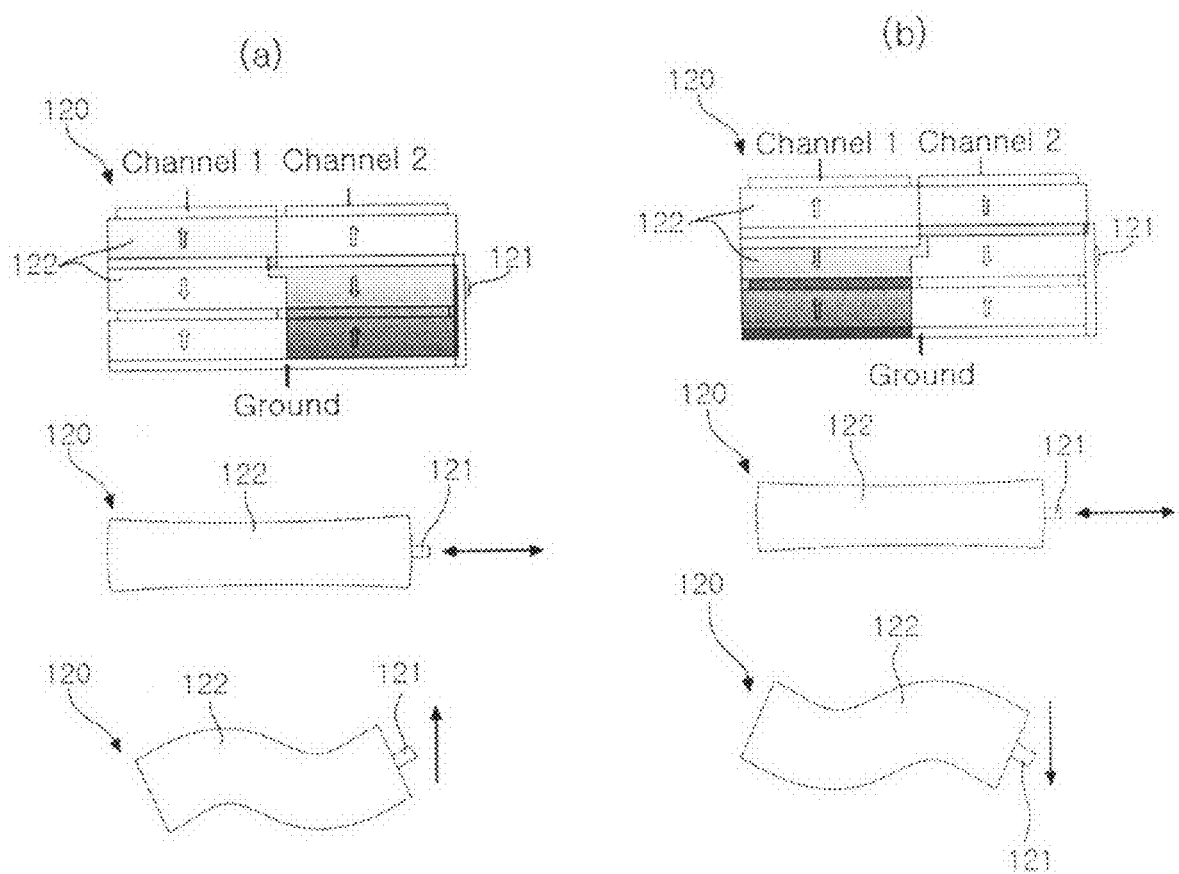
FIGS. 12(a) and (b) are conceptual views illustrating internal and external electrodes and vibration modes of the piezoelectric vibrator adopted in the lens driving device according to the present invention.

As the piezoelectric vibrator 120 is simultaneously driven by the longitudinal and bending modes at a resonant frequency of at least 20 kHz in an ultrasonic region, the friction member 121 attached to an end of the piezoelectric body 122 moves along an elliptical locus or path. The direction of the elliptical locus movement is determined by the resonant frequency determined by internal and external electrodes of the piezoelectric body 122, and this in turn enables adjustment of the transport direction of the lens. The internal and external electrodes and the vibration modes are conceptually illustrated in FIGS. 12(a) and (b).

That is, in response to selective power application through channel 1 or channel 2, the piezoelectric body 122 having a stack of multiple layers simultaneously performs the longitudinal (flexural) mode and the bending mode, and thus the friction member 121 provided at one end of the piezoelectric body 122 makes a linear motion in upward and downward directions.

At this time, the direction of the bending mode vibration is congruent with the direction in which the piezoelectric layers of the piezoelectric body 122 are stacked and also coincides with the optical axis direction of an AF module provided in the present invention. The present invention adopts a resonant frequency in about a 300 kHz region, which is adjustable according to the length, width and thickness of the piezoelectric vibrator.

As mentioned above, as the piezoelectric vibrator 120 is fixed by the vertical ribs 151 and 152 to be prevented from rotational movement, the friction member 121 makes only vertical, back-and-forth linear movement, and the direction of the vibration locus is adjusted upward or downward in response to the resonant frequency applied to the piezoelectric body 122.

Therefore, the friction member 121 which makes only a vibration locus of vertical direction conveys the driving power via the friction member 124 provided at the extension part 112 of the lens barrel 110, which is the object of transport. Thus, the lens barrel 110 is elevated or lowered in the optical axis direction along the first and second guide rods 141 and 142 of the guiding part 140.

Here, since the friction force generated between the friction member 121 of the piezoelectric vibrator 120 and the friction member 124 of the extension part 112 is greater than the friction force generated between the extension part 112 and the first and second guide rods 141 and 142, and the friction members 121 and 124 form a point contact with each other to prevent misalignment of the optical axis of the lens barrel 110, more stable vertical movement of the lens barrel 110 is allowed.

In addition, the point contact between the friction member 121 and the friction member 124 is maintained constant by the resilient force of the preload member 130 provided to resiliently compress the piezoelectric vibrator 120 against the extension part 112.

In addition, since the point of contact between the friction member 122 and the friction member 124 is flush with the center of the first guide rod 141, the resilient power of the preload member 130 is conveyed to the extension part 112 without any loss, maximizing the capacity of the piezoelectric vibrator 120.

As described above, the lens barrel 110 is moved vertically along the first guide rod 141 disposed in the first guide groove 115 of the extension part 112 and the second guide rod 142 disposed in the second guide groove 116 of the extension part 112 by the driving power provided by the piezoelectric vibrator 120.

Here, the bearing member 143 is disposed between the first guide rod 141 and the first guide groove 115, and the retainer 143*e* of the bearing member 143 has pairs of upper and lower balls 143*a* and 143*b* which form point contacts with circumferential surfaces of the first guide rod 141 and outer surfaces of the first guide groove 115 to minimize friction loss. The first guide rod 141 and the left and right pairs of upper and lower balls 143*a* and 143*b* are disposed at positions corresponding to respective vertexes of a triangle.

Therefore, the first guide rod 141 form stable point contacts with the bearing member 143 to prevent misalignment of the lens barrel, thereby stably guiding the vertical movement of the lens barrel 120.

In addition, the second guide rod 142 which is disposed in parallel with and apart at a predetermined interval from the first guide rod 141, is in contact with a circumferential surface of the second guide groove 116, thus preventing the lens barrel 110 from rotating about the first guide rod 141 during its vertical movement.

Here, the second guide rod 142 is in point contact with inner protrusions 116*a* and 116*b* protruded from the inner circumferential surface of the second guide groove 116, minimizing the friction loss generated during the vertical movement of the lens barrel while reducing the power loss of the piezoelectric vibrator 120.

In the meantime, the vertical movement of the lens barrel 110 along the first and second guide rods 141 and 142 is detected by the location sensor 160 which senses the indicator 119 protruded from an outer surface of the lens barrel 110, and thereby the external force that vertically moves the lens barrel 110 by the driving power of the piezoelectric vibrator 120 is appropriately controlled based on the amount of the detected vertical movement.

As set forth above, the present invention adopts a linear driving mechanism in which a piezoelectric vibrator which is in point contact with an extension part extended radially from a lens barrel so as to be compressed against the extension part by a preload member, conveying driving power to the lens barrel. This allows a more simplified structure than a conventional electromagnetic driving mechanism using a cam, facilitating miniaturization.

In addition, this piezoelectric linear driving mechanism minimizes the loss of driving power transferred to the lens barrel, which is the object of transport, thereby allowing a larger transport range with lower input power and increased driving efficiency than the prior art.

Furthermore, the present invention adopts a simpler mechanism for guiding the movement of the lens barrel, enabling more accurate and stable movement of the lens, thereby attaining superior quality images.

While the present invention has been shown and described in connection with the exemplary embodiments, it will be apparent to those skilled in the art that modifications and variations can be made without departing from the spirit and scope of the invention as defined by the appended claims.

What is claimed is:

1. A lens driving device comprising:
    a lens barrel comprising a lens holder for holding at least one lens therein and an extension part extended from the lens holder;
    a piezoelectric vibrator providing a driving power necessary for driving the lens barrel, the piezoelectric vibrator comprising a piezoelectric body for being flexed and bent in response to applying the driving power, and a friction member disposed at a leading end of the piezoelectric body in contact with the extension part, to move the lens barrel in a bending direction of the piezoelectric body;
    a preload member providing resilient force that compresses the piezoelectric vibrator against the extension part, the preload member having a free end thereof in resilient contact with a rear end of the piezoelectric body to maintain contact between the extension part of the lens barrel and the friction member of the piezoelectric vibrator; and
    a guiding part for guiding movement of the lens barrel in an optical axis direction, the guiding part including
        a first guide rod having a predetermined length disposed vertically in a first guide groove formed in a portion of the extension part to be movable on a bearing member having upper and lower ball pairs in point contacts with outer surfaces of the first guide groove and outer surfaces of the first guide rod and a retainer having a plurality of upper and lower ball grooves in which the upper and lower balls are rotatably disposed, and a second guide rod having a predetermined length disposed vertically in a second guide groove formed in another portion of the extension part.

2. The lens driving device according to claim 1, wherein the piezoelectric vibrator comprises a piezoelectric ultrasonic motor having a plurality of piezoelectric layers stacked in a bending direction to produce at least two vibration modes through internal and external electrode structures.

3. The lens driving device according to claim 1, wherein the lens barrel further comprises a friction member provided on a vertical surface of the extension part, the friction member being disposed perpendicular with the friction member of the piezoelectric vibrator to form a contact therebetween.

4. The lens driving device according to claim 3, wherein the friction member is disposed in a groove depressed in the vertical surface of the extension part.

5. The lens driving device according to claim 3, wherein the friction member of the extension part has a height that is 1.5 times a transfer distance of the lens barrel.

6. The lens driving device according to claim 1, wherein the preload member comprises a plate spring including the free end in resilient contact with the rear end of the piezoelectric vibrator, and a fixed end fixed to a base where the piezoelectric vibrator is disposed and a protrusion protruding from a surface of the free end thereof so as to be in point contact with the rear end of the piezoelectric vibrator.

7. The lens driving device according to claim 1, wherein the preload member has a length longer than a length of the piezoelectric vibrator.

8. The lens driving device according to claim 1, wherein the upper and lower balls and the first guide rod are disposed at positions corresponding to respective vertexes of a triangle.

9. The lens driving device according to claim 1, wherein the first guide rod has a center flush with the point of contact between the friction member of the piezoelectric vibrator and the friction member of the extension part.

10. The lens driving device according to claim 1, wherein the point of contact between the friction member of the piezoelectric vibrator and the friction member of the extension part is flush with the point of contact between the free end of the preload member and the piezoelectric vibrator.

11. The lens driving device according to claim 1, wherein the second guide rod is disposed in the second guide groove having a rectangular section such that the second guide rod is in point contact with an inner projection protruding from an inner surface of the second guide groove.

12. The lens driving device according to claim 1, further comprising a base on which the lens barrel is mounted, wherein the base comprises a vertical rib for fixing the piezoelectric body of the piezoelectric vibrator, a fixing groove in which the fixed end of the preload member is fixed, and a fixing hole in which a lower end of the guiding part is fixed.

13. The lens driving device according to claim 12, wherein the vertical rib comprises a resilient fixing member extending vertically from a lower surface thereof which is in contact with a lower end of the piezoelectric body to have a resilient contact with opposed outer surfaces of the piezoelectric body.

14. The lens driving device according to claim 12, wherein the vertical rib has a fixing plate disposed in contact with an upper surface of the piezoelectric body so as to prevent upward disengagement and play of the piezoelectric vibrator.

15. The lens driving device according to claim 12, wherein the fixing groove is provided between a pair of fixing ribs provided in a corner of the base to form a gap in which the fixed end of the preload member is fixedly inserted.

16. The lens driving device according to claim 1, further comprising an indicator provided at a surface of the lens barrel, and a location sensor for sensing a location of the indicator upon vertical movement thereof.

17. A lens driving device, comprising:

a lens barrel comprising a lens holder for holding at least one lens therein and an extension Dart extended from the lens holder;

a piezoelectric element that moves a lens barrel when an electric field applied to the piezoelectric element determines a bent state of the piezoelectric element, wherein an initial position of the lens barrel is elastically restored when the electric field is not applied and a guiding part for guiding movement of the lens barrel in an optical axis direction, the guiding part including a first guide rod having a predetermined length disposed vertically in a first guide groove formed in a portion of the extension Dart to be movable on a bearing member having upper and lower ball pairs in point contacts with outer surfaces of the first guide groove and outer surfaces of the first guide rod and a retainer having a plurality of upper and lower ball grooves in which the upper and lower balls are rotatably disposed, and a second guide rod having a predetermined length disposed vertically in a second guide groove formed in another portion of the extension part.

18. A lens driving device comprising:

a lens barrel comprising a lens holder for holding at least one lens therein and an extension part extended from the lens holder;

a piezoelectric vibrator providing a driving power necessary for driving the lens barrel, the piezoelectric vibrator comprising a piezoelectric body for being flexed and bent in response to applying the driving power, and a friction member disposed at a leading end of the piezoelectric body in contact with the extension part, to move the lens barrel in a bending direction of the piezoelectric body;

a preload member providing resilient force that compresses the piezoelectric vibrator against the extension part, the preload member having a free end thereof in resilient contact with a rear end of the piezoelectric body to maintain contact between the extension part of the lens barrel and the friction member of the piezoelectric vibrator; and a guiding part for guiding movement of the lens barrel in an optical axis direction wherein the lens barrel further comprises a friction member provided on a vertical surface of the extension part, the friction member being disposed perpendicular with the friction member of the piezoelectric vibrator to form a contact therebetween, and the friction member of the extension part has a height that is 1.5 times a transfer distance of the lens barrel.

* * * * *

UNITED STATES PATENT AND TRADEMARK OFFICE
CERTIFICATE OF CORRECTION

| | |
|---|---|
| PATENT NO. | : 7,457,060 B2 |
| APPLICATION NO. | : 11/707165 |
| DATED | : November 25, 2008 |
| INVENTOR(S) | : Ki Mun Paik et al. |

Page 1 of 1

It is certified that error appears in the above-identified patent and that said Letters Patent is hereby corrected as shown below:

Column 12, Line 14, change "Dart" to --part--.

Column 12, Line 20, change "applied" to --applied,--.

Column 12, Line 25, change "Dart" to --part--.

Signed and Sealed this

Tenth Day of March, 2009

JOHN DOLL
*Acting Director of the United States Patent and Trademark Office*